US007431502B2

(12) United States Patent
Fidziukiewicz

(10) Patent No.: US 7,431,502 B2
(45) Date of Patent: Oct. 7, 2008

(54) UNIVERSAL CAM SLIDE

(75) Inventor: Erich D. Fidziukiewicz, South Lyon, MI (US)

(73) Assignee: Anchor Lamina America, Inc., Farmington HIlls, MI (US)

( * ) Notice: Subject to any disclaimer, the term of this patent is extended or adjusted under 35 U.S.C. 154(b) by 853 days.

(21) Appl. No.: 10/941,730

(22) Filed: Sep. 15, 2004

(65) Prior Publication Data

US 2006/0056746 A1 Mar. 16, 2006

(51) Int. Cl.
*F16C 17/00* (2006.01)

(52) U.S. Cl. .......................................... 384/9; 72/452.9

(58) Field of Classification Search ..................... 384/9; 72/452.9

See application file for complete search history.

(56) References Cited

U.S. PATENT DOCUMENTS 5,101,705 A 4/1992 Matsuoka
5,231,907 A 8/1993 Matsuoka
5,269,167 A 12/1993 Gerhart et al.
5,347,838 A 9/1994 Matsuoka
5,487,296 A 1/1996 Gerhart et al.
5,711,180 A 1/1998 Sasahara et al.
5,746,082 A * 5/1998 Matsuoka .................... 72/313
5,784,916 A 7/1998 Matsuoka
5,884,521 A 3/1999 Fidziukiewicz
5,904,064 A * 5/1999 Higuchi ..................... 72/452.9
5,931,074 A 8/1999 Matsuoka
6,230,536 B1 * 5/2001 Matsuoka .................... 72/313
6,539,766 B2 * 4/2003 Matsuoka .................... 72/313

OTHER PUBLICATIONS

International Search Report for PCT/US05/29759, dated Nov. 21, 2006.

* cited by examiner

*Primary Examiner*—Richard W L Ridley
*Assistant Examiner*—Justin Krause
(74) *Attorney, Agent, or Firm*—Schnader Harrison Segal & Lewis, LLP

(57) ABSTRACT

Universal aerial and die-mount cams, each having an adapter assembly, a driver, and a slide sandwiched between the adapter assembly and the driver. The adapter assembly has a universal adapter having an arcuate portion that is angularly adjustable within arcuate recesses in opposing side plates of the universal adapter so that bearing surfaces of the universal adapter slidably oppose a first group of bearing surfaces of the slide and a second group of bearing surfaces of the slide slidably oppose bearing surfaces of the driver, the latter bearing surfaces being parallel to or inclined to the horizontal. Three ranges of longitudinal driver inclination angles can be accommodated by using the same slide and universal adapter and one of two pairs of side plates.

17 Claims, 7 Drawing Sheets

UNIVERSAL CAM SLIDE

BACKGROUND OF THE INVENTION

1. Field of the Invention

The invention relates generally to aerial and die-mount cams and more particularly to improvements in universal cams configured to facilitate their assembly using identical slides and other components that do not require custom fitting to provide slide movements within a wide range of angles.

2. Background Art

Aerial and die-mount cams are often used to operate tools for such manufacturing processes as punching, trimming, stamping and bending workpieces. These devices include elements that convert downward and upward forces provided by a press into laterally directed component forces that advance and retract a tool in lateral directions to effect the mentioned processes.

The wide variety of applications of the cams results in a proportional number of different component configurations to accommodate the demands made to move tools in required directions. Typically, the major components of a cam include an adapter assembly connected to one of a pair of platens of a press, a driver connected to the other of the pair of platens, and a slide positioned between the adapter assembly and the driver so that the slide is forced to advance and retract when the platens are forced together and apart, respectively.

The angle relative to the horizontal along which the slide is forced to move is that of the inclination of the driver. The slide and/or the adapter assembly must therefore be configured to accommodate the inclination of the driver. In view of this, the typical cam requires adapter assemblies and/or slides that have as many configurations as associated drivers have inclinations. It would therefore be advantageous from the standpoint of cost and time saved during the design, manufacture and assembly of cams to fabricate cams requiring slides and adapter assemblies, each of which having only one respective configuration, to provide slide motions in directions over a large range of angles. Similar advantages would result from fabricating cams requiring slides having only one configuration and adapter assemblies having only two configurations to provide slide motions over an additional range of angles.

SUMMARY OF THE INVENTION

In carrying out the foregoing object, the aerial and die-mount cams, which are basically inverted versions of each other, each include a slide and an adapter assembly arranged in vertically stacked relation. Between the slide and the adapter assembly are slidably arranged bearing surfaces for coupling the slide and the adapter assembly and for relative sliding movement upon closing and opening of platens of a press between which a cam can be arranged.

Additional bearing surfaces are arranged on the slide for relative sliding movement between the slide and a driver. The adapter assembly is angularly adjustable, continuously rather than incrementally, to accommodate a driver having a bearing surface ranging from being uninclined to the horizontal to being inclined at an acute angle.

The adapter assembly has a universal adapter for engaging and shifting the slide and also has a pair of opposing side plates. The universal adapter has an arcuate portion, and each side plate has an arcuate recess complementing the arcuate portion of the universal adapter. The arcuate recesses of the side plates receive the arcuate portion of the universal adapter and allow a desired angular adjustment of the universal adapter.

The slide has surfaces arranged in a five-sided configuration that includes a central surface with a pair of laterally canted guiding surfaces along opposite edges of the central surface and a pair of oppositely laterally canted coupling surfaces along the outer edges of the guiding surfaces. The guiding surfaces are disposed at a right angle to the coupling surfaces and at an obtuse angle to the central surface. The slide also includes a resilient member that is compressed when the slide is advanced and that expands to retract the slide.

The universal adapter has surfaces arranged in a five-sided configuration complementing the five-sided configuration of the slide. The configuration includes a central surface opposed to the central surface of the slide, a pair of guiding surfaces along opposite edges of the central surface of the cam adapter opposed to the guiding surfaces of the slide, and a pair of coupling surfaces along the outer edges of the last mentioned guiding surfaces. The central surfaces are disposed substantially perpendicularly to the direction of major loading forces on the slide and cam assembly. The universal adapter also has a pair of keeper plates, each being secured to a different one of the pair of coupling surfaces of the slide. Each of the keeper plates slidably overlaps an opposing coupling surface of the universal adapter to connect the slide and universal adapter for conjoint movement.

The configurations of the aerial and die-mount cams described result in production and on-site assembly efficiencies that save costs and time while providing precision, stable and long-lasting cams capable of bearing heavy loads.

DETAILED DESCRIPTION OF THE PREFERRED EMBODIMENTS

Figure 1:
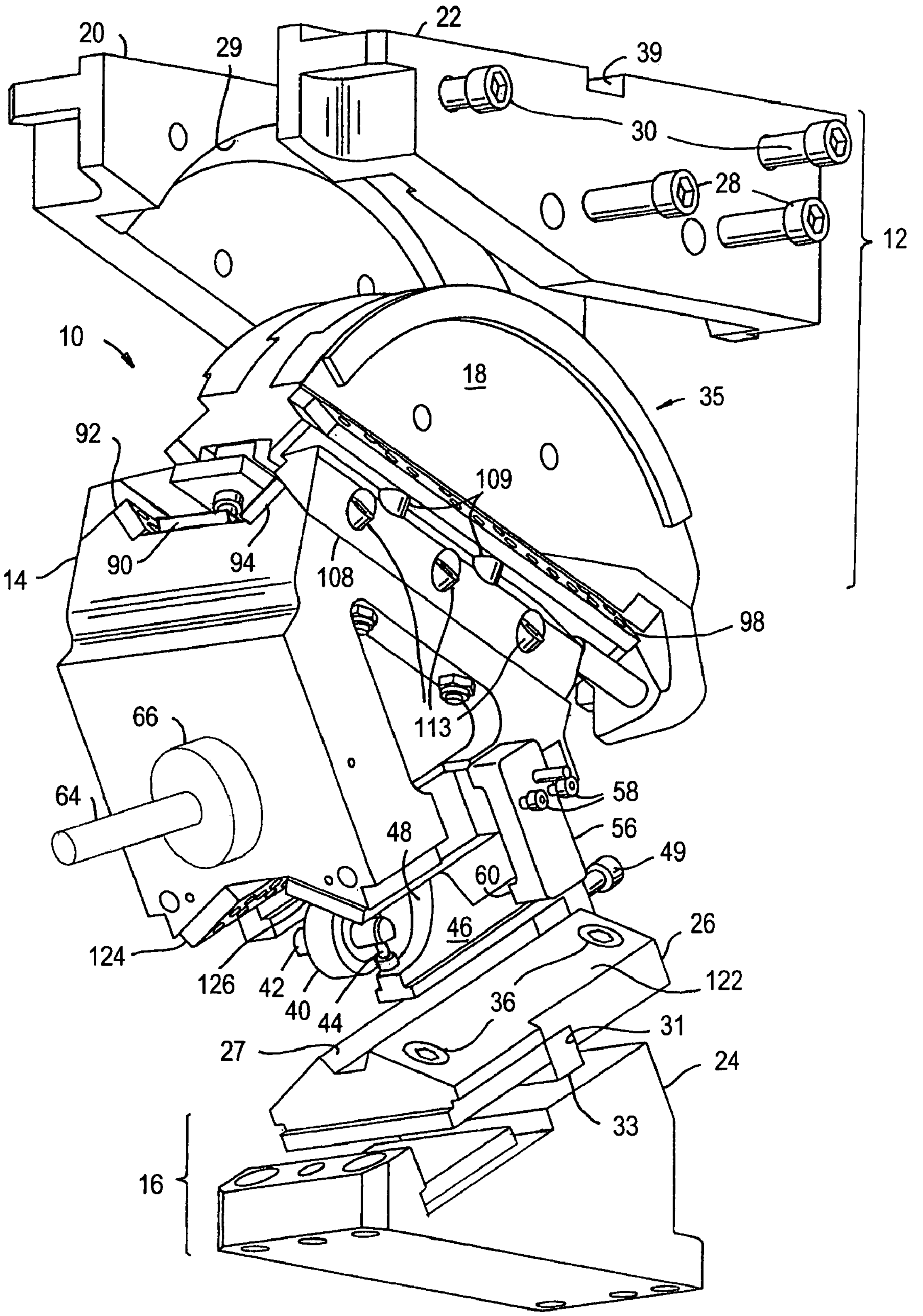
FIG. 1 is an exploded, perspective view showing the front and a side of an aerial cam according to the present invention and illustrating a combination of a slide, an adapter assembly and a driver as well as a universal adapter and side plates of the adapter assembly.

Although the drawing figures all represent aerial cams, it will be understood by those skilled in the art that the aerial cams shown can be converted to die-mount cams with little more effort than would be required to invert them. The following descriptions and definitions of aerial cams therefore apply as well to die-mount cams. It will also be understood that component surfaces referred to as central, guiding, and coupling surfaces and their associated wear plates serve, during at least a portion of each cam operation, as load bearing surfaces.

It should be noted that FIGS. 3, 4, 5, 6, 7 and 11 do not reveal all inner details of the cams. FIGS. 1, 2, 8, 9 and 10, however, are exploded and sectional views that do reveal details of inner structures. The figures show side and perspective views of one side and the ends of the cams. Although not shown, respective opposite sides and components and features located there are mirror images of the components and features on the sides that are shown.

Figure 2:
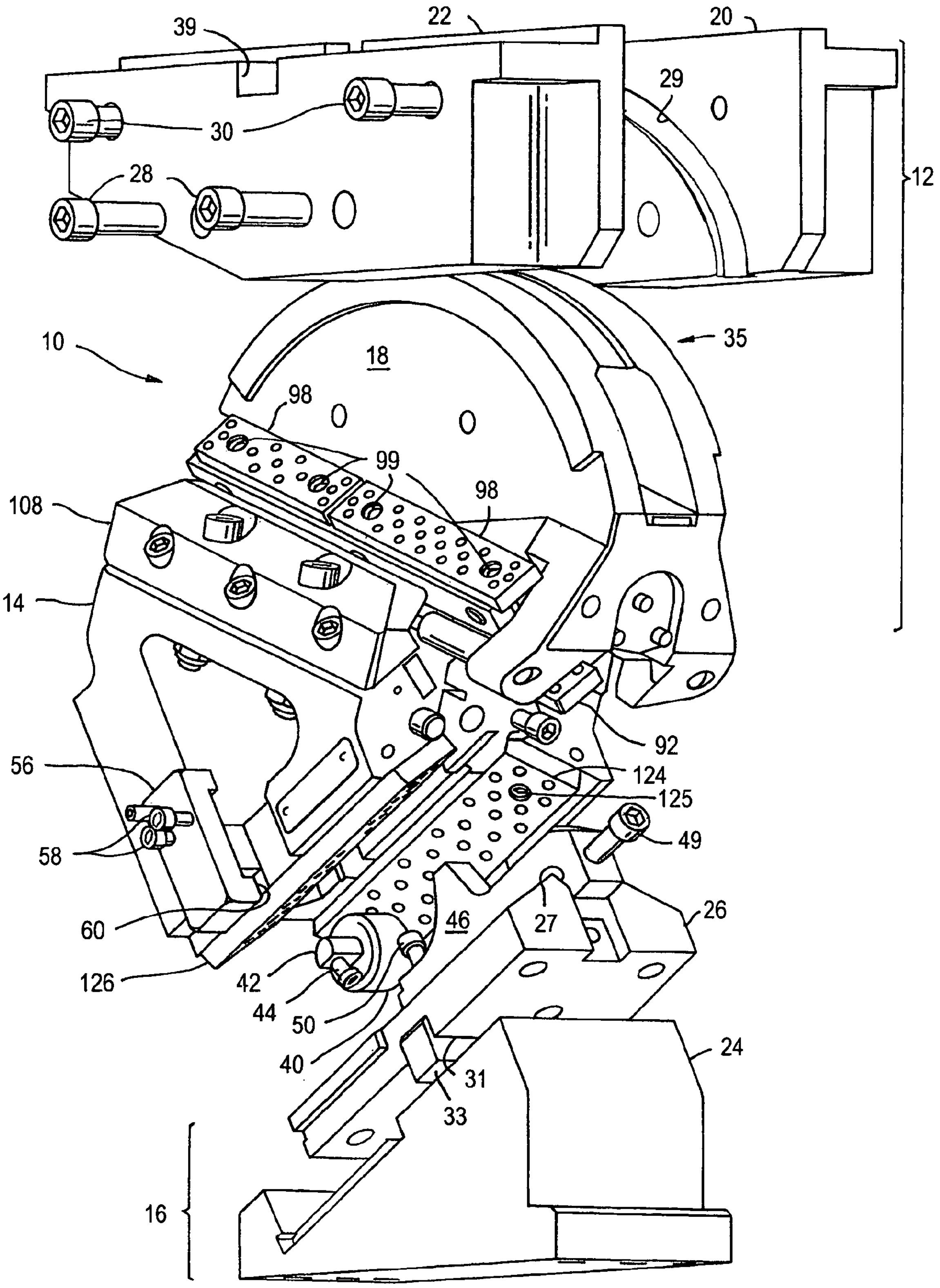
FIG. 2 is a perspective view similar to that of FIG. 3, but showing the rear and the side of the aerial cam.

FIGS. 1 and 2 are perspective views of an aerial cam, generally indicated by the reference numeral 10, that is representative of the present invention. The cam 10 includes a cam driving member, or adapter assembly, generally indicated by the reference numeral 12, a tool holding member, or slide, 14, and a driver, generally indicated by the reference numeral 16. The adapter assembly 12 includes a universal adapter 18 for engaging and shifting the slide 14 and also includes opposing side plates 20 and 22. The universal adapter 18 has an arcuate portion, generally indicated by the reference numeral 35, and each side plate 20 and 22 has an arcuate recess 29 complementing the arcuate portion 35 of the universal adapter 18. The arcuate recesses 29 of the side plates 20 and 22 receive the arcuate portion 35 of the universal adapter 18 and allow a continuous rather than an incremental angular adjustment of the universal adapter 18. The universal adapter 18 is then maintained at the desired angle relative to the side plates 20 and 22 with fastening members such as bolts 28 and a key 37 (FIG. 7) that fits in a keyway 39. The side plates 20 and 22 are also secured to each other by fasteners such as bolts 30 and by fasteners such as bolts 32 (FIG. 7) to an upper platen 34 (FIG. 7) of a press (not shown). The driver 16 includes a driver base 24 and a V-block 26. The driver V-block 26, which has a slot 27 extending longitudinally along its apex, is held in position by a key 33 fitting within a keyway 31 (FIGS. 1, 2 and 8) and secured to the driver base 24 by fasteners such as bolts 36 through in the V-block 26. The driver base 24 is secured with fasteners such as bolts 32 (FIG. 7) to the lower platen 38 (FIG. 7) of a press (not shown).

Figure 8:
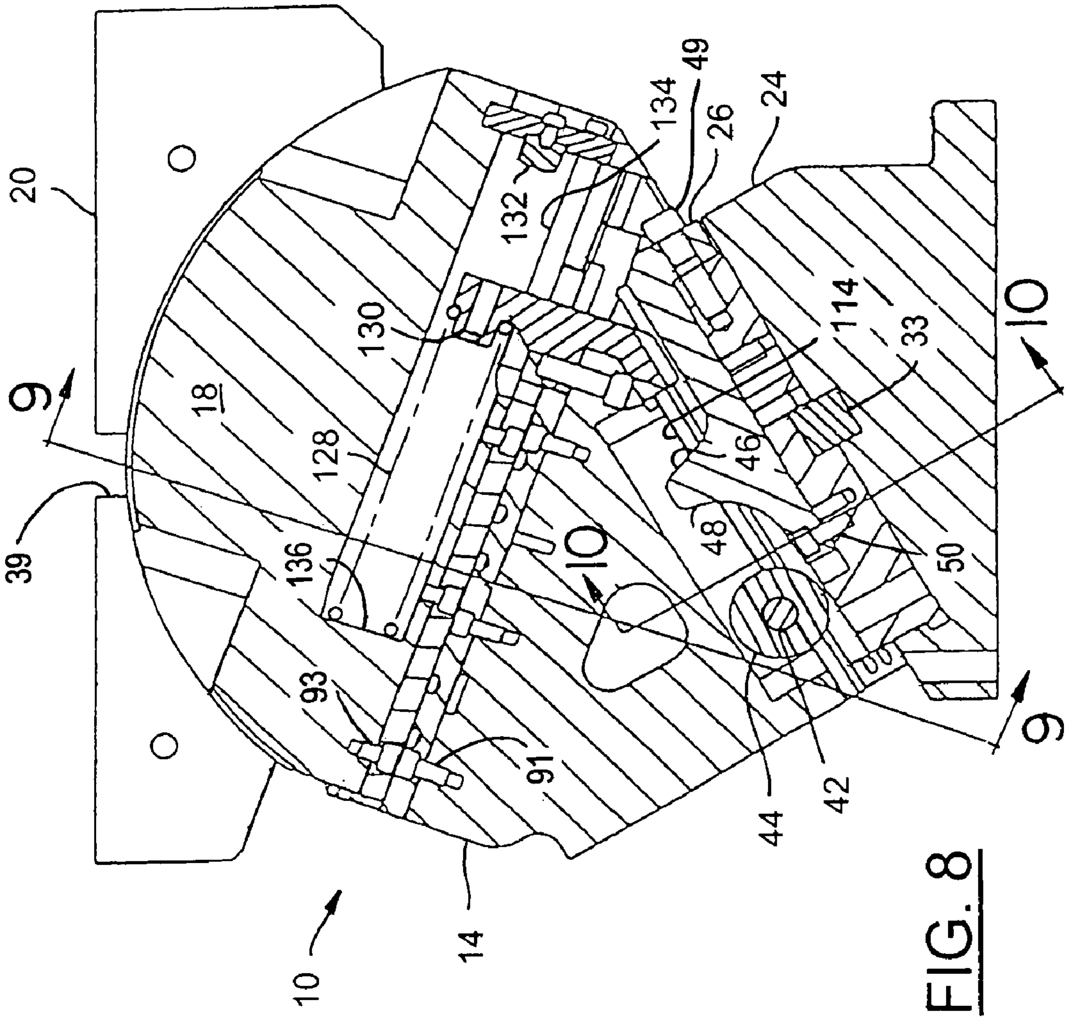
FIG. 8 is a cross-sectional view, taken along line 8-8, of the aerial cam of FIG. 6 and additionally shows a slide return spring bracket and a slide return bumper.

A roller 40 is rotatably supported on a roller shaft 42, which is secured to the slide 14 by fasteners, such as bolts 44 (only one of which shown), passing through the roller shaft 42 and into the slide 14. A ramp 46 having an arcuate ramp surface 48 (FIGS. 1 and 8) is secured to the V-block 26 within the slot 27 by fasteners such as bolts 49 and 50 (FIGS. 2 and 8). The roller 40 cooperatively engages the arcuate ramp surface 48 (FIG. 1) to advance the slide 14 when the press (not shown) forces the slide 14 and the driver 16 together, and the arcuate ramp surface communicates force to the slide. It should be noted that the ramp 46 and the roller 40 are not necessary to the operation of the cam 10 but can be used to gradually redirect a downwardly directed force from the slide toward the stationary V-block 26 to a longitudinally directed force to advance the slide 14.

A pair of positive return members 56 (FIGS. 4 and 5) and 54 (FIG. 5) are secured to the sides of the slide 14 by fasteners such as bolts 58. At ends distal from the bolts 58 securing the positive return members 54 and 56 to the slide 14, the positive return members 54 and 56 each has a generally rectangular projection 59 (FIG. 10) and 60 (FIGS. 1, 2, 3, 5 and 6). The driver base 24 has an elongate slot 52 (FIGS. 3, 4, 6, 7 and 11), which extends along a portion of each side, into which the projections 59 and 60 slidably extend. The elongate slot 52 extends at the same longitudinal inclination as that of the V-block 26.

Figure 9:
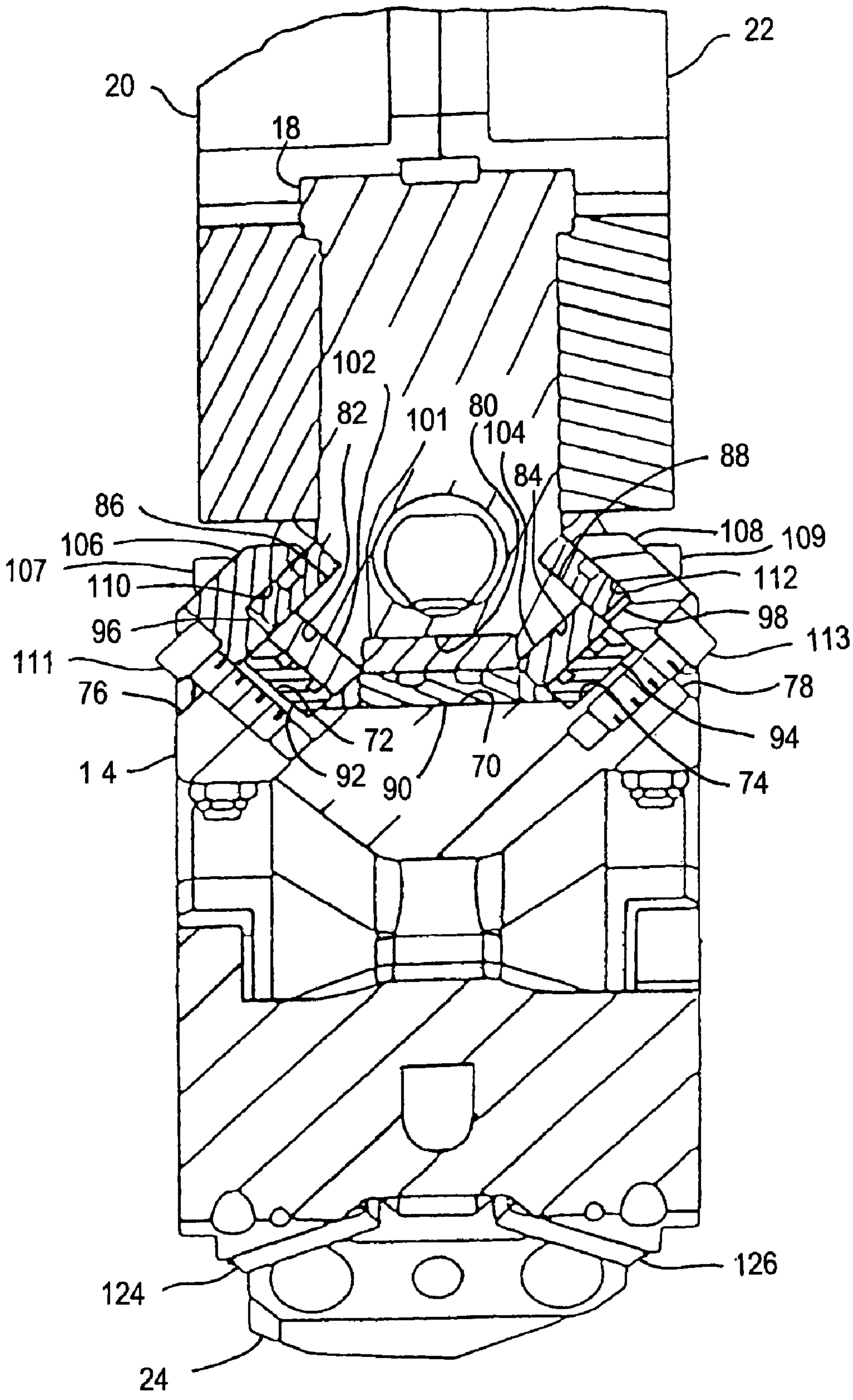
FIG. 9 is a cross-sectional view, taken along the line 9-9, of a portion of the aerial cam of FIG. 8.

As shown by FIG. 9, which is a cross-sectional view taken along the line 9-9 of FIG. 8, the slide 14 has a first group of surfaces arranged in a five-sided configuration that includes a central surface 70, a pair of laterally canted guiding surfaces 72 and 74 along opposite edges of the of the central surface 70, and a pair of oppositely laterally canted coupling surfaces 76 and 78 along the outer edges of the guiding surfaces 72 and 74. The guiding surfaces 72 and 74 are disposed at a right angle relative to the coupling surfaces 76 and 78, and at an obtuse angle to the central surface 70. The central surface 70 is disposed substantially perpendicularly to the direction of major loading forces on the slide 14 and cam assembly 12 (FIG. 1).

The universal adapter 18 of the adapter assembly 12 (FIG. 1) has a group of surfaces arranged in a five-sided configuration complementing the five-sided configuration of the first group of surfaces of the slide. The configuration of the universal adapter surfaces includes a central surface 80 opposed to the central surface 70 of the slide 14, a pair of guiding surfaces 82 and 84 along opposite edges of the of the central surface 80 and opposed to the guiding surfaces 72 and 74 of the slide 14, and a pair of coupling surfaces 86 and 88 along the outer edges of the guiding surfaces 82 and 84.

The central surface 70 of the slide 14 has a wear plate 90, preferably formed of a self-lubricating material, secured to it by fasteners such as bolts 91 (FIG. 8). The guiding surfaces 72 and 74 of the slide 14 have wear plates 92 and 94, respectively, preferably formed of self-lubricating material, secured to them by fasteners such as bolts (not shown). The central surface 80 of the universal adapter 18 has a wear plate 101 secured to it by fasteners such as bolts 93 (FIG. 8) to slidably contact the opposing wear plate 90. The guiding surfaces 82 and 84 of the universal adapter 18 have wear plates, 102 and 104, respectively, secured to them by fasteners such as bolts (not shown) to slidably contact the opposing wear plates 92 and 94 of the slide 14. The coupling surfaces 86 and 88 of the universal adapter 18 have wear plates 96 and 98, preferably formed of self-lubricating material, secured to them by fasteners such as bolts 99 (FIG. 2). A pair of keeper plates 106 and 108 are secured to the coupling surfaces 76 and 78 of the slide 14 with fasteners such as bolts 107, 109, 111 and 113. The keeper plates each have a surface 110 and 112 that overlaps and slidably contacts an opposing one of the wear plates 96 and 98 to couple the slide 14 and universal adapter 18 for conjoint movement.

Figure 10:
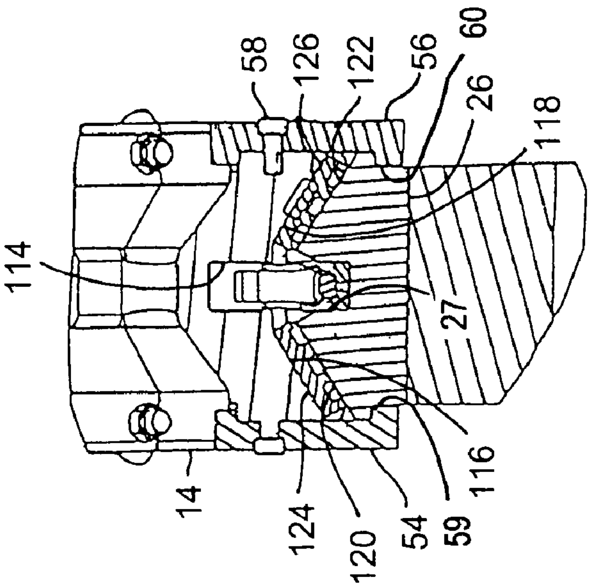
FIG. 10 is a cross-sectional-view, taken along the line 10-10, of a portion of the aerial cam of FIG. 8.

With reference to FIG. 10, which is a cross-sectional view taken along the line 10-10 of FIG. 8, the slide 14 has a slot 114 opposite the slot 27 within the V-block 26. The roller 44 and the ramp 46 (FIG. 8) reside partially within the slot 114. A pair of guiding surfaces 116 and 118 extend along the edge of the slot 114 in the slide 14, and a pair of guiding surfaces 120 and 122 extend along the slot 27 in the V-block, opposing the guiding surfaces 116 and 118 of the slide 14. A pair of wear plates 124 and 126, preferably formed of self-lubricating material, are secured to the pair of guiding surfaces 116 and 118 of the driver 14 with fasteners such as bolts 125 (FIG. 2) for slidably contacting the opposing guiding surfaces 120 and 122 of the V-block.

As shown by the sectional view of FIG. 8, the universal adapter 18 of the cams of the present invention has a channel such as a slotted bore 134 and includes a resilient member, such as a coil spring 128 or a gas spring (not shown), mounted on a spring bracket 130 secured to the slide 14. The coil spring 128 extends through the bore 134 and compresses against a closed end 136 of the bore 134 when the slide 14 advances. The slide 14 is urged by the spring 128 to retract as the latter decompresses. Also shown is a shock absorbing member, such as a resilient bumper or a hydraulic shock absorber, 132 secured to the universal adapter 18 to cushion the retracting spring bracket 130 and slide 14 as the latter reaches its retracted position.

Figure 7:
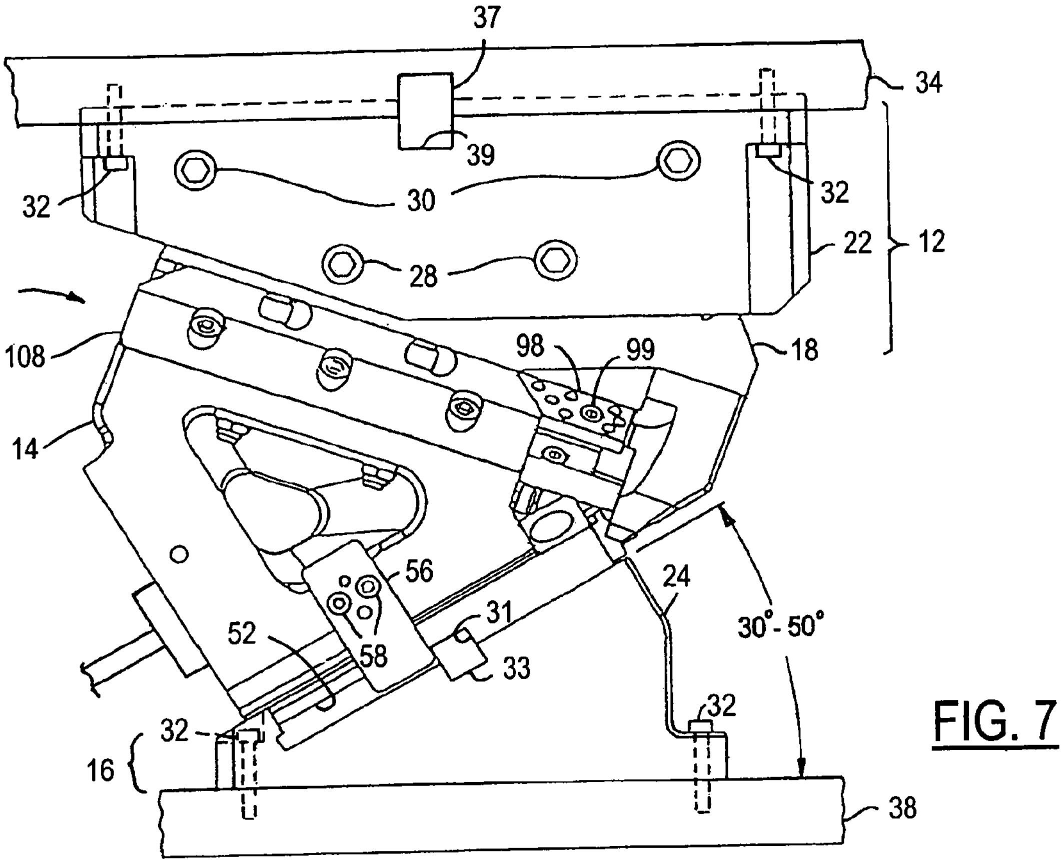
FIG. 7 is a side view of the aerial cam of FIG. 6, the cam being capable of adjustment to accept a driver having an incline within a range from 30 to 50 degrees.

With reference again to FIGS. 1 and 2, during cam assembly, the angular relationship of the universal adapter 18 to the side plates 20 and 22 is adjusted to accommodate the longitudinal inclination angle of a specified driver 16. In the portion 35 of the universal adapter 18 having an arcuate configuration, a keyway is formed to coincide with the keyway 39 in the side plates 20 and 22 and to receive a key 37 (FIG. 7). Holes are drilled through the side plates 20 and 22 into the universal adapter 18, and bolts 28 (FIG. 7) are inserted to maintain, with the key 37, the position of the universal adapter 18 relative to the side plates 20 and 22.

A representative tool 64 is shown mounted on the slide 14 with a representative tool holder 66. The driver 24, as shown by FIGS. 1, 2 and 6 through 10, has a longitudinal inclination of 30 degrees. The slide 14, and the tool 64 attached to it will be advanced at that angle. The configurations of the universal adapter 18 and the side plates 20 and 22 of the adapter assembly 12 are such that a driver 16 having a longitudinal inclination from 30 to 50 degrees can be accommodated using the same slide 14 and adapter assembly 12.

Figure 3:
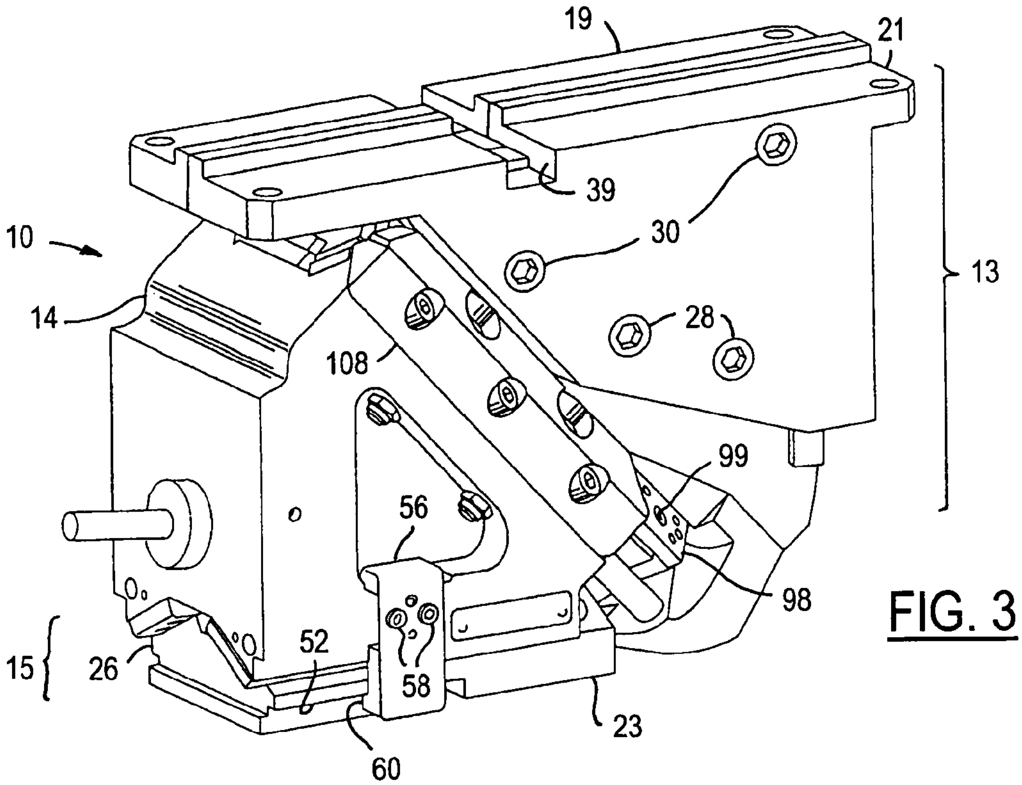
FIG. 3 is perspective view of an aerial cam similar to that of FIG. 1 and having an uninclined driver.
Figure 6:
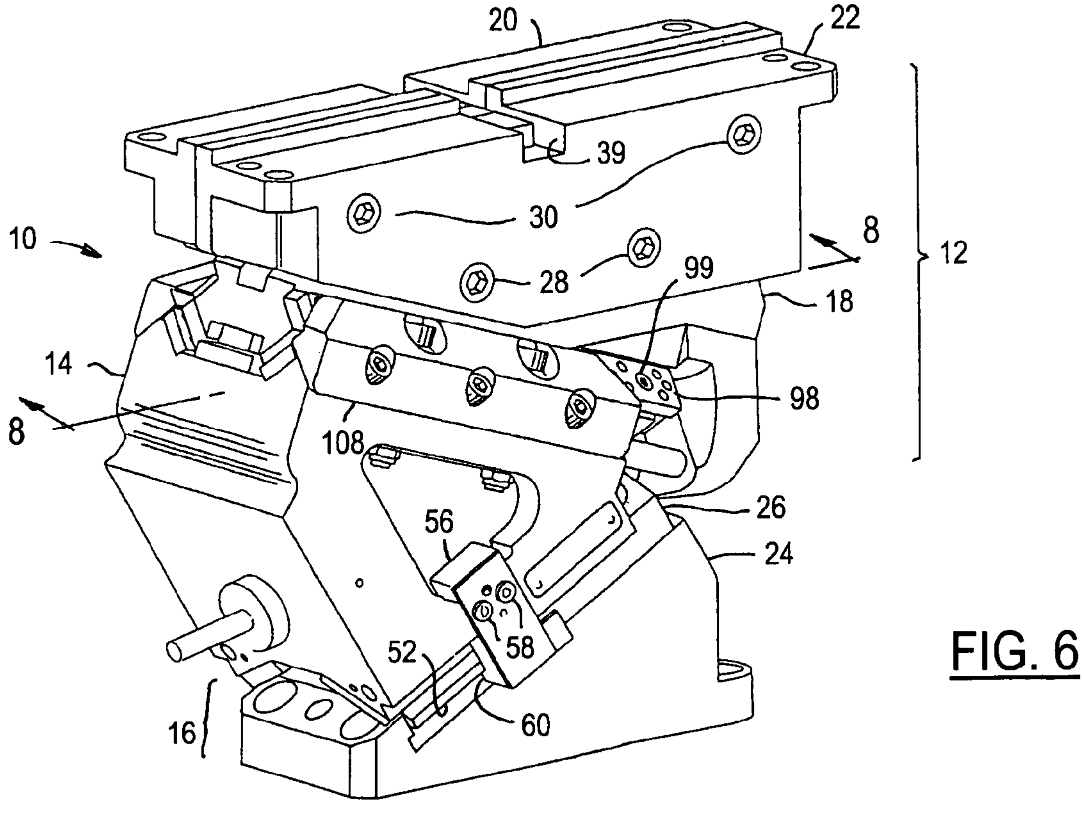
FIG. 6 is a perspective view of the assembled cam of FIGS. 1 and 2.
Figure 4:
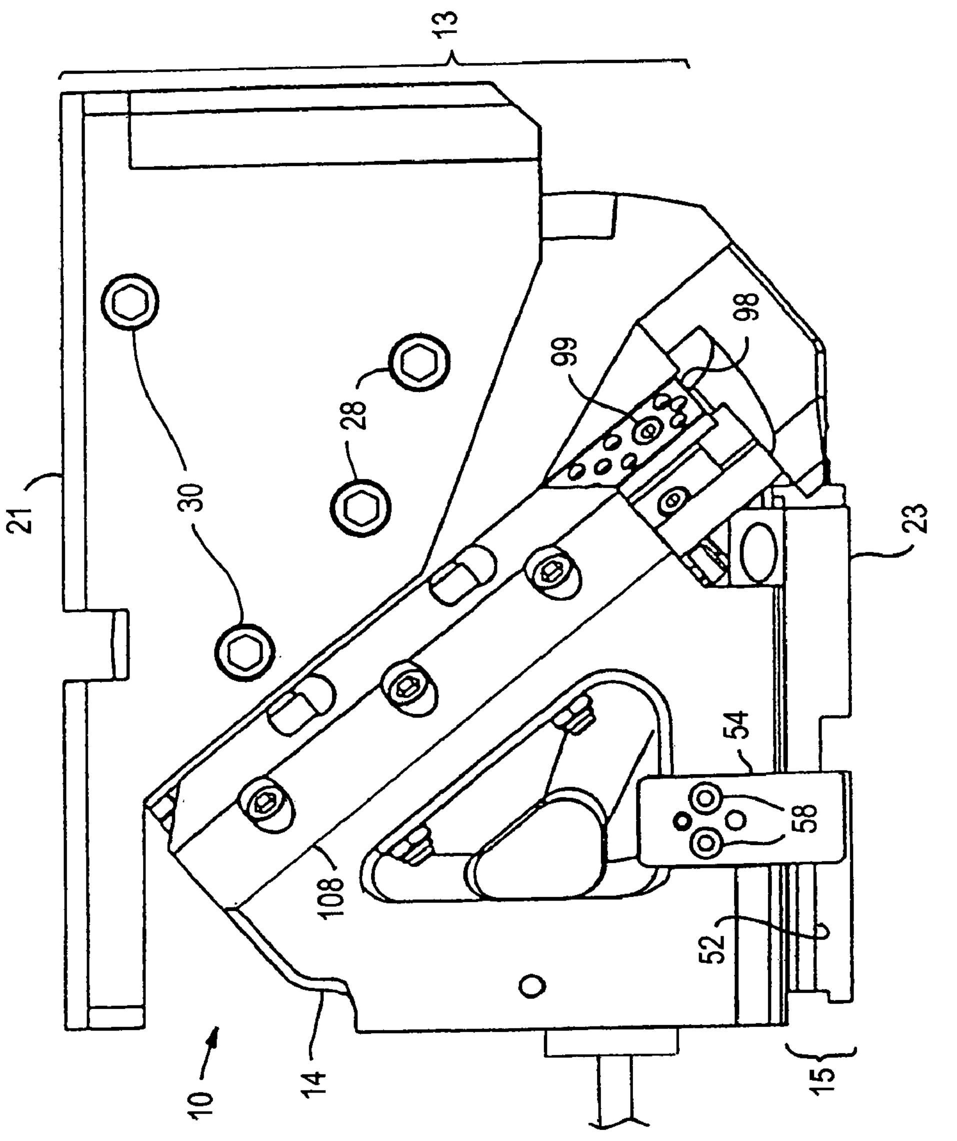
FIG. 4 is a side view of the aerial cam of FIG. 3, the cam being capable of adjustment to accept a driver having an incline within a range from zero to 30 degrees.
Figure 5:
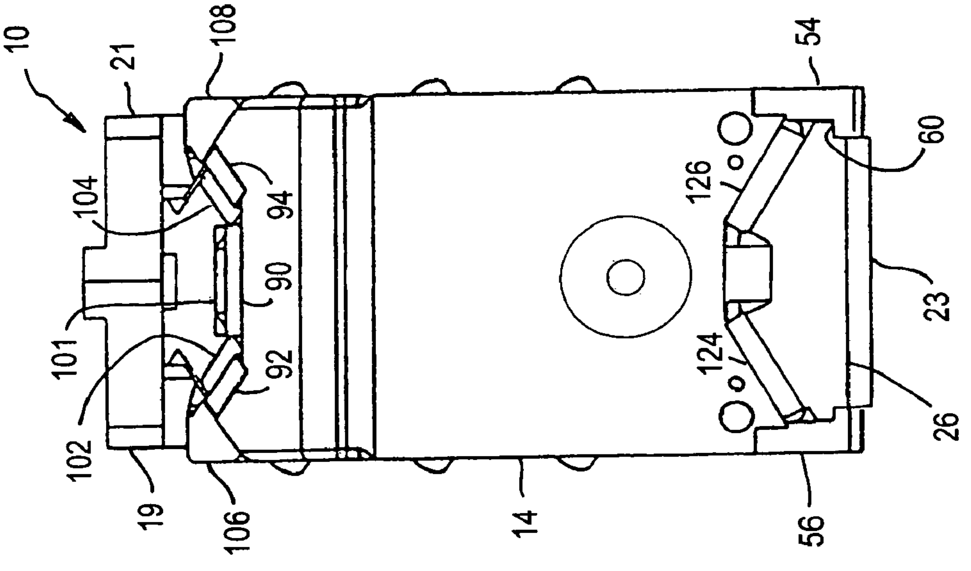
FIG. 5 is a front view of the aerial cam of FIG. 4.

FIGS. 3, 4 and 5 show a driver 15 having an uninclined driver base 23. The side plates 19 and 21 are shaped somewhat differently from those (20 and 22) used with drivers of different longitudinal inclinations, but the slide 14 and the universal adapter 18 of the adapter assembly 13 are the same. The configurations of the universal adapter 18 and the side plates 19 and 21 are such that a driver 15 having a longitudinal inclination from zero to 30 degrees can be accommodated using the same slide 14 and universal adapter 18.

Figure 11:
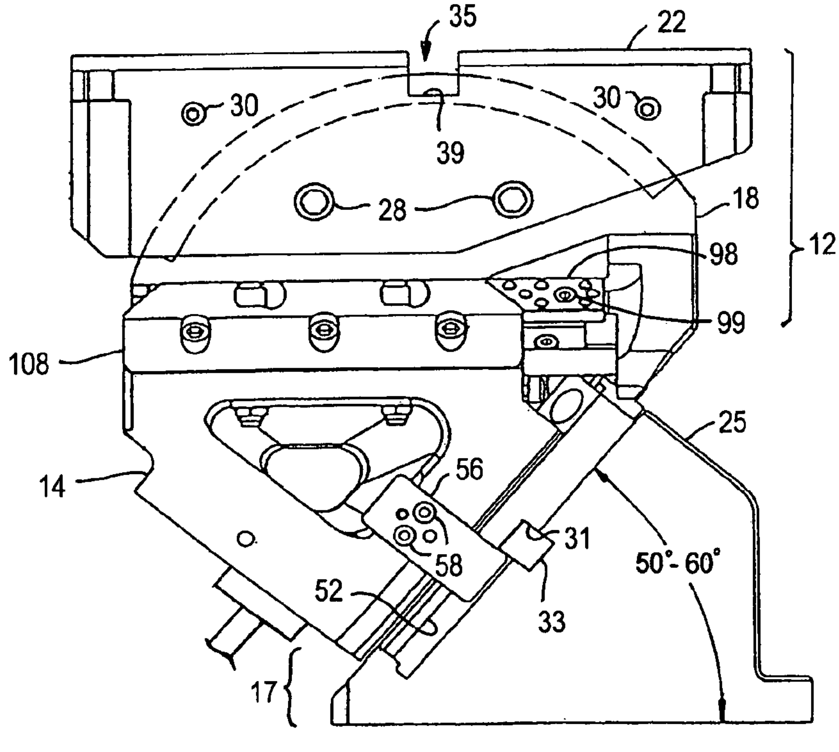
FIG. 11 is a side view of an aerial cam similar to that of FIG. 7 and additionally includes a ghost view of a segment of a universal adapter of the adapter assembly, the cam being capable of adjustment to accept a driver having an incline within a range from 50 to 60 degrees.

FIG. 11 shows a driver 17 having a longitudinal inclination of 50 degrees. The side plates (represented by the one plate 22 shown) are the same as those used with drivers 16 having a longitudinal inclination from 30 to 50 degrees, but they are reversed from right to left as viewed. The configurations of the universal adapter 18 and the side plates 20 and 22 are such that a driver 17 having a longitudinal inclination from 50 to 60 degrees can be accommodated using the same slide 14 and adapter assembly 12.

The aerial cam 10 shown by FIGS. 1 and 2 will now be used in describing the operation of the cam. When the side plates 20 and 22 of the adapter assembly 12 are pressed downwardly by the upper platen 34 (FIG. 7) of the press (not shown), the universal cam 18 secured to the side plates 20 and 22 exerts attending forces upon the central surface 70 and the guiding surfaces 72 and 74 of the slide 14. The slide 14, in turn, exerts forces upon the guiding surfaces 120 and 122 (FIG. 10) of the driver V-block 26. Since, in all the aerial cam configurations described and claimed, at least one interface between the universal adapter 18 and the slide 14 and between the slide 14 and the driver V-block 26 is longitudinally inclined relative to the horizontal, a laterally directed component force advances the slide 14. The tool 64 secured to the slide 14 by the tool holder 66 is advanced toward a workpiece (not shown).

When the side plates 20 and 22 are pulled upwardly by the upper platen 34 (FIG. 7) of the press (not shown), the universal cam 18 secured to the side plates 20 and 22 exerts upward forces upon the surfaces 110 and 112 of the keeper plates 76 and 78, which are secured to the slide 14. The resulting upward movement of the universal cam 18 removes the load force from the slide 14; and the compressed spring 128, while expanding, urges the slide 14 to retract. Also secured to the slide 14 are the positive return members 54 and 56 (FIG. 5) the projections 59 (FIG. 10) and 60 (FIGS. 1, 2, 3, 5, 6 and 10) of which slidably reside within the elongate slots (only the slot 52 being shown by FIGS. 3, 4, 6, 7 and 11) that extend along a portion of each side of the driver V-block 26. When the slide 14 is pulled upwardly, an upward force is exerted on the driver 16 by the projections 59 (FIG. 10) and 60 (FIGS. 1, 2, 3, 5, 6 and 10). Since the driver 16 is anchored by the lower platen 38 of the press (not shown), the slide 14 is forced to retract in a direction parallel to the longitudinal inclinations of the V-block 26 and the elongate slot 52. The positive return members 54 and 56 (FIG. 5) thus provide a positive, additional means for retracting the slide 14.

Since die-mount cams are effectively an inverted embodiment of the aerial cam 10, their operation is basically the same as that of the aerial cam 10 previously described.

As a result of the described configurations of the aerial and die-mount cams having components that do not require custom fitting, there is an increase in production and on-site assembly efficiencies that saves costs and time while providing precision, stable and long-lasting cams capable of bearing heavy loads.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Improvements in universal aerial or die-mount cams, comprising:

a slide and an adapter assembly arranged in vertically stacked relation;

slidably arranged bearing surfaces between the slide and the adapter assembly for coupling the slide and the adapter assembly and for relative sliding movement upon closing and opening of platens of a press between which a cam can be arranged;

additional bearing surfaces on the slide arranged for relative sliding movement between the slide and a driver, and a portion of the adapter assembly being angularly and continuously adjustable to enable one slide to accommodate drivers having bearing surfaces ranging from being uninclined to the horizontal to being inclined at an acute angle;

wherein the adapter assembly comprises:

a universal adapter for engaging and shifting the slide and having an arcuate portion; and a pair of opposing side plates each having an arcuate recess complementing the arcuate portion of the universal adapter to receive the arcuate portion of the universal adapter, to allow a continuous angular adjustment of the universal adapter in the plane of motion of the slide, and to maintain a desired angular adjustment.

2. The invention defined by claim 1, wherein:

the slide has bearing surfaces arranged in a five-sided configuration having a central surface with a pair of guiding surfaces along opposite edges of the central surface and a pair of coupling surfaces along the outer edges of the guiding surfaces, the guiding surfaces being disposed at a right angle to the coupling surfaces and at an obtuse angle to the central surface;

the universal adapter has bearing surfaces arranged in a five-sided configuration complementing the five-sided configuration of the slide and including a central surface opposed to the central surface of the slide, a pair of guiding surfaces along opposite edges of the central surface of the cam adapter opposed to the guiding surfaces of the slide, and a pair of coupling surfaces along the outer edges of the last mentioned guiding surfaces, the central surfaces being disposed substantially perpendicularly to the direction of major loading forces on the slide and cam assembly; and the universal adapter further has a pair of keeper plates, each being secured to a different one of the pair of coupling surfaces of the slide and slidably overlapping an opposing coupling surface of the universal adapter to connect the slide and universal adapter for conjoint movement.

3. The invention defined by claim 2, wherein the adapter assembly further comprises at least one fastening member to maintain a desired angular relationship between the universal adapter and the side plates.

4. The invention defined by claim 2, further comprising opposed double wear plates secured to the opposed central and guiding surfaces, and a wear plate secured to each of the coupling surfaces of the universal adapter.

5. The invention defined by claim 1, further comprising a resilient member that is compressed when the slide is advanced and that expands to retract the slide.

6. The invention defined by claim 5, wherein the resilient member is a coil spring.

7. The invention defined by claim 5, wherein the resilient member is a gas spring.

8. The invention defined by claim 5, further including a shock absorbing member to cushion the retracting slide as the latter reaches its retracted position.

9. The invention defined by claim 5, wherein the shock absorbing member is a resilient bumper.

10. The invention defined by claim 5, wherein the shock absorbing member is a hydraulic shock absorber.

11. The invention defined by claim 1, further comprising:

a driver for engaging and shifting the slide, the driver having a pair of laterally canted bearing surfaces; and the slide having laterally canted bearing surfaces arranged in a two-sided configuration complementing and opposing the pair of laterally canted bearing surfaces of the driver.

12. The invention defined by claim 11, wherein the driver has a longitudinal inclination that is fixed.

13. The invention defined by claim 11, wherein the driver has a longitudinal inclination that is adjustable.

14. The invention defined by claim 11, wherein the driver comprises a driver base and a V-block supported by the driver base, the V-block having the pair of laterally canted bearing surfaces opposing the pair of laterally canted bearing surfaces of the slide.

15. The invention defined by claim 11, the slide further comprising a pair of wear plates, each of the wear plates being secured to a different one of the laterally canted bearing surfaces of the slide.

16. The invention defined by claim 15, further comprising:

a positive return member secured to each side of the slide, each positive return member having a projection, and the driver base of the driver having an elongate slot that extends along a portion of each side at the same longitudinal inclination as that of the laterally canted bearing surfaces, the projections of the positive return member being slidably received within each elongate slot.

17. The invention described by claim 11, further comprising:

a roller rotatably supported by the slide; and a ramp having an arcuate ramp surface and being secured to the driver, the roller cooperatively engaging the arcuate ramp surface to advance the slide when the press forces the slide and the driver assembly together, the arcuate ramp surface communicating force to accelerate the slide gradually.

* * * * *

UNITED STATES PATENT AND TRADEMARK OFFICE

CERTIFICATE OF CORRECTION

PATENT NO. : 7,431,502 B2
APPLICATION NO. : 10/941730
DATED : October 7, 2008
INVENTOR(S) : Erich D. Fidziukiewicz It is certified that error appears in the above-identified patent and that said Letters Patent is hereby corrected as shown below:

In col. 4, line 65, change “driver” to “slide”.

Signed and Sealed this

First Day of September, 2009

David J. Kappos
*Director of the United States Patent and Trademark Office*